Jan. 15, 1946.  P. W. LEE  2,392,929
MANUFACTURE OF ARTIFICIAL TEETH AND OTHER MOLDED ARTICLES
Filed July 17, 1943  2 Sheets-Sheet 1
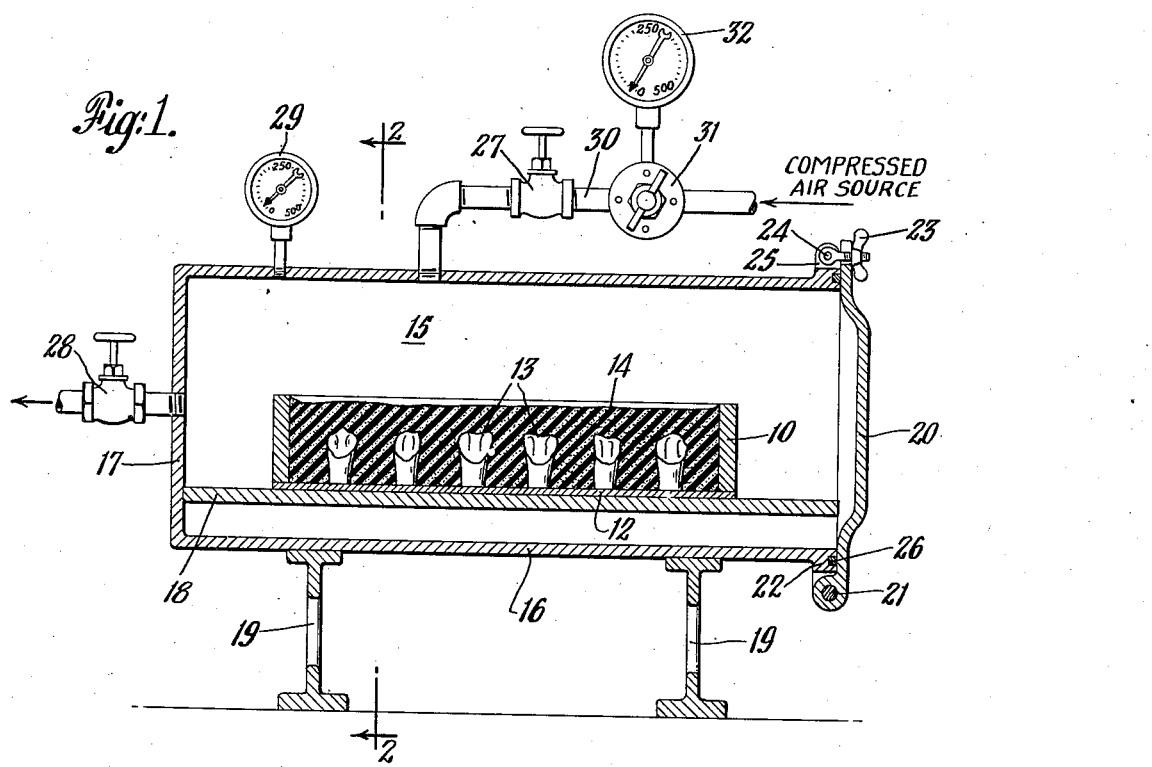
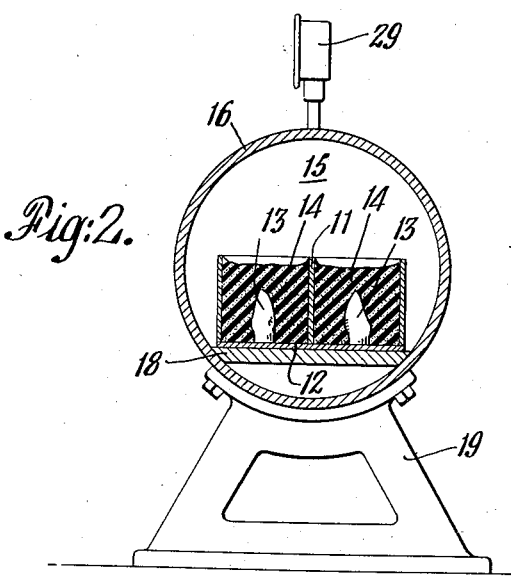
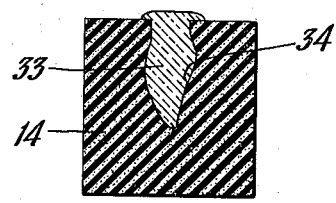
INVENTOR
PYUNGTOO W. LEE
BY
Donald W. Robertson
ATTORNEY Jan. 15, 1946.   P. W. LEE   2,392,929
MANUFACTURE OF ARTIFICIAL TEETH AND OTHER MOLDED ARTICLES
Filed July 17, 1943    2 Sheets-Sheet 2

INVENTOR
PYUNGTOO W. LEE
BY
Donald W. Robertson
ATTORNEY

Patented Jan. 15, 1946

2,392,929

UNITED STATES PATENT OFFICE 2,392,929

MANUFACTURE OF ARTIFICIAL TEETH AND OTHER MOLDED ARTICLES

Pyungtoo W. Lee, York, Pa., assignor to The Dentists' Supply Company of New York, New York, N. Y., a corporation of New York Application July 17, 1943, Serial No. 495,140

11 Claims. (Cl. 18—55.1)

The invention relates to the manufacture of artificial teeth and other molded articles; and more particularly, to a method of producing molds for use in making reproductions of such articles, or for use in making patterns or models from which mold equipment is to be produced.

The present invention was developed in the course of experiments in the manufacturing of porcelain reproductions of natural teeth. It is recognized that the methods to be disclosed are applicable to the reproduction of many other kinds of articles. However, to assist in conveying a full understanding of the nature of the invention, I shall begin by describing its specific application to the manufacture of artificial teeth in accordance with my original discovery.

In the manufacture of fused or vitreous porcelain teeth, it is customary to employ molds which initially form the teeth to a size which is substantially larger than that of the finished teeth. This initial increase in size is intended to compensate for the shrinkage which occurs in the subsequent step of firing the molded teeth or "biscuits" to vitrify them, depending upon the particular kind of porcelain material used, temperature of firing, and other known variables. Molds generally are designed to produce unfired teeth or biscuits which are from about 12 per cent to about 18 per cent larger than the size of the finished teeth which are to be made.

The porcelain, in addition to shrinking, loses sharpness of surface detail during the firing step. The fine lines and other surface markings which characterize natural teeth and which add so much to the beauty of their appearance quite frequently are lost or smoothed out in the firing.

Various methods have been devised heretofore to make enlarged reproductions of natural teeth so as to compensate for shrinkage, and with the object of reproducing the natural tooth forms in artificial teeth. One method which has been used is to make an enlarged model of the natural tooth by means of a pantograph. This is a laborious operation and is subject to both mechanical and personal inaccuracies. Another method heretofore proposed for producing an enlarged model to compensate for shrinkage is to make a latex matrix of the original object and to expand the matrix a controlled amount by means of swelling the latex in organic liquids. This method is designed to produce accurate reproductions of natural teeth to an enlarged scale (or to a reduced scale) so that the finished teeth will be of the size desired.

Both the pantographic method and the latex method have the serious disadvantage that, while seeking to compensate for loss in size due to shrinkage, they provide no solution for the problem of how to correct for loss in surface detail upon firing. So far as I am aware, the only solution of that problem which has been known entails hand carving of the enlarged model or hand cutting of the tooth molds in order to provide the desired surface details or characterizations in the finished teeth. Hand carving or cutting inevitably introduces variations from the natural pattern which is to be reproduced, and the result is that fidelity cannot be achieved in the reproduction.

In the course of development work in the manufacture of porcelain reproductions of natural teeth, I have discovered that by surrounding a plaster model or the like with a viscous material such as a plasticized vinyl chloride, and subjecting such material to elevated pressure while it sets toward a rubber-like consistency, there is produced a mold which can be used to form enlarged reproductions of the model. I have discovered that in such reproductions, the surface features such as the lines, serrations, and other characterizations of natural teeth, are intensified. The intensification is such that the appearance of such surface details is somewhat exaggerated, so that in effect the enlargement of the characterizing surface features is proportionately greater than the enlargement of the tooth as a whole. This feature can be utilized to compensate for the loss in detail which occurs when a porcelain tooth or the like is fired to vitrify it.

In the light of this discovery, it is an object of my invention to provide a method of reproduction which overcomes the disadvantages of enlarging methods known or used heretofore, and more particularly, the disadvantages which have been discussed hereinabove.

A general object of the invention is to provide an improved method of making enlarged reproductions of existing articles.

Another object is to provide, in the molding of a reproduction of a model, a method of producing intensified surface features. Other objects and advantages will appear as the description proceeds.

In accordance with my invention as applied in one of its preferred forms to the reproduction of a model of an article, I first mount the model in a suitable flask and pour the viscous mold material into the flask so as to surround the model. The model may be made of plaster or other nonvitreous ceramic material. However, if the original article which is to be reproduced has an adsorptive surface, the mold material may be poured directly against such article. On the other hand, if the article to be reproduced is a natural tooth, or if it is made of glass, vitrified porcelain, metal, or of other material having a non-adsorptive surface, it is then desirable to first make a model of the article in plaster, or to provide it with a non-vitreous ceramic surface so that the pattern against which the mold material is to be poured will have the proper characteristics to produce the novel intensification phenomenon which I shall describe.

Assuming that we start with a natural tooth, the first step, then, is to make a model of the tooth in plaster or other suitable material. This model can be made by any means known to the art, and the method of making the model forms no part of the present invention. It may, for example, be made by setting up the natural tooth in a mold flask and pouring into the flask a vinyl chloride material in flowable condition. After the vinyl chloride material has set to a resilient mass, or rubber-like consistency, the natural tooth may be removed, after which the mold can be used to form the plaster model.

The plaster model then is set up in any suitable manner in a flask, and a viscous material such as a vinyl chloride material in flowable condition is disposed around the model in the flask. The viscous material is subjected to super-atmospheric pressure as the viscous mold material sets toward a rubber-like consistency. The pressure may be applied during the entire period required for the setting of the mold material to a gel or to a rubber-like consistency, and must be applied during at least a portion of such setting period. Thereafter, the pressure may be decreased for a substantial additional period, and finally the model may be removed from the mold by simply lifting it out of the cavity of the resilient mass.

By following this procedure, the elastic mold so formed can be used in making reproductions of the natural tooth, or in making patterns or models from which suitable mold equipment is to be produced. I have found that such reproductions, patterns and models are characterized by greater size than the natural tooth or starting model; moreover, that they are further characterized by a pronounced intensification of surface markings such as the lines, ridges, serrations, hollows, undulations, cracks or checks. Such surface markings or characterizations serve to break up light reflected from the finished artificial tooth, enhance its beauty and increase the naturalness of its appearance. In view of the pronounced intensification of surface details of this character as found in the reproductions or models produced by my method, fired porcelain teeth produced by using the intensified reproductions as patterns or models will more closely duplicate the natural tooth than is the case with artificial teeth produced by methods known heretofore. The intensification or exaggeration of the surface features can be adjusted to compensate for any loss of surface detail which may be encountered in the tooth manufacturing process, such as the smoothing out of porcelain surfaces due to firing, the wear of plastic teeth due to polishing, or the natural wear of the tooth molds due to continued service.

The degree of enlargement of the reproduction and the degree of intensification of the surface features depends in certain measure on the nature of the material employed for the model, and the nature of the plastic or other material employed for the mold. It also depends very largely on the amount of pressure applied to the mold material as it sets to form. The pressure may be applied in any desired manner, as by means of gaseous or pneumatic pressure in an enclosed chamber surrounding the flask, or mechanically as by means of a plunger pressing against an enclosed body of the mold material. In my preferred method, gaseous pressure is employed, such as air or carbon dioxide. I have found that within the limits which I will disclose, the higher the pressure, the greater will be the degree of enlargement and the greater will be the degree of intensification of surface features.

Any desired degree of enlargement and intensification can be obtained by repeating the steps I have outlined two or more times using the reproduction model as the starting model of successive molding operations. Thus the reproduction model made as described would be arranged in a flask and viscous mold material poured around it, as was done in the case of the original model, applying pressure as before as the mold material sets to form. This process can be repeated as many times as may be desired.

I have found that increased pressures are effective to produce greater enlargement and greater intensification until a pressure of approximately 400 pounds per square inch is reached. Increases in pressure above this amount do not produce any substantial increase in the degree of enlargement, and no further intensification seems to take place at higher pressures. The relation of pressure to degree of enlargement can be seen from the following table:

| Pressure | Enlargement |
|---|---|
| Lbs./sq. in. | Per cent |
| 50 | 3.3 |
| 100 | 4.8 |
| 200 | 6.3 |
| 300 | 8.2 |
| 400 | 9.6 |
| 500 | 9.1 |
| 600 | 9.6 |
| 700 | 9.9 |
| 800 | 9.6 |
| 900 | 9.3 |

This test data shows that maximum enlargement occurs when a pressure of around 400 pounds per square inch is employed during the setting of the mold material. Variations in the percentage of enlargement shown for higher pressures probably are attributable to normal test variations. The data was recorded in practical tests on tooth reproduction, and the measurement of size increases in such small irregularly shaped objects introduces a rather large percentage of error. However, the data assembled from this and related tests appears to establish quite definitely that the degree of enlargement increases directly with the pressure up to a point in the neighborhood of 400 pounds per square inch, or less. At least this is true for tooth models made of a gypsum base plaster used in forming molds of a plasticized polyvinyl chloride (known to the trade as "Korogel").

I have observed, moreover, that the increase in degree of intensification seems to be proportionate to the increase in degree of enlargement. That is to say, the degree of intensification (as well as enlargement) increases directly with the pressure up to a point in the neighborhood of 400 pounds per square inch, or less.

Some variation in the optimum pressure may be encountered with the use of different mold materials of the class described, or with the use of different model materials of the class described. However, I believe that in general the results will be substantially the same. For example, I have tested a number of model materials with substantially similar results, namely, plaster of Paris, gypsum base plasters or artificial stones, Portland cement, powdered clay, biscuited dental porcelain, diatomaceous earth, magnesium oxide, zinc oxide, calcium oxide, etc. Model materials which I have found to be unsuited include glass, vitrefied porcelain, metals, and natural teeth. In general it may be stated that the model should present to the mold material a non-vitreous ceramic surface. A model material which permits at least limited penetration by fluids appears to be satisfactory, such as one which has an adsorptive or absorptive surface.

The viscous mold material should be one which is capable of setting to a resilient mass or gel, such as a polymerized vinyl chloride which congeals to a rubber-like consistency. It must of course be capable of setting to form so that it will serve as a mold. In general the mold material should be in the nature of a hot or cold plastic substance in flowable condition so that it can be introduced into the flask as by pouring it over the model and then be subjected to elevated pressure during at least a portion of the period required for it to set to a substantially non-flowable condition. In this manner a pressure differential is maintained between the surface of the model and the surface of the viscous mold material during setting of the latter.

In order that the nature and purposes of my invention may be more fully understood, I have included illustrations of one form of apparatus suited to the practice of the method described as applied to the manufacture of artificial teeth; also, illustrations of tooth reproductions intended to show, at least qualitatively, the curious "intensification" phenomenon explained hereinabove. In the drawings:

Figs. 1 and 2 show a preferred form of pressure chamber, Fig. 1 being a vertical central longitudinal sectional view, and Fig. 2 a transverse sectional view taken on the line 2—2 of Fig. 1.

Fig. 3 is a detail sectional view of the completed mold showing a tooth reproduction cast therein.

Figure 4:
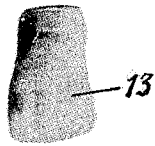

Figs. 4 to 8 are retouched photolithographic reproductions of actual tooth models made in accordance with the invention described. Fig. 4 shows a starting model. Figs. 5 to 8, inclusive, show reproduction models produced under pressures of 50, 100, 200 and 300 pounds per square inch, respectively.

Figure 8:
Figure 9:

Fig. 9 is a similar view, showing a finished tooth produced from a mold made from the model of Fig. 8.

Within the pressure chamber of Figs. 1 and 2 is a flask 10 which may be made of brass or other suitable material. The flask shown is one adapted to forming molds for two sets of six anterior teeth, and consists of a rectangular box with a partition 11 through the center, dividing it into two sections, as may be desired. Mounted on the base 12 of the flask, as by means of a suitable adhesive, are the tooth models 13, made of plaster or other non-vitreous ceramic material in the manner which has been described. These tooth models may be either exact duplicates of natural teeth, enlargements of such teeth produced in any manner known to the art, or enlargements made in accordance with the intensification method I have described. In the instance last named, the apparatus which will now be described should be considered in its application to a repetition of the intensification process. That is to say, the apparatus may be used for initial enlargement and intensification of a model which is an exact duplicate of a natural tooth, and subsequently used for further enlargement and further intensification of the enlarged and intensified model initially produced.

Fig. 4 illustrates a tooth model of the sort which is mounted on the base 12 of the flask. This is a labial or face view of an upper left central and represents a model of an artificial tooth which it is desired to reproduce. The model is enlarged 16 per cent over the size of the natural tooth to be duplicated, such enlargement having been obtained in any of the manners indicated in the previous paragraph. It should be distinctly understood that the models 13 illustrated in Figs. 1 and 2 of the drawings may be exact duplicates of natural teeth without previous enlargement. In the specific example I now describe, I am simply assuming that one of the previous enlargement steps has been performed.

With the flask 10 outside of the pressure chamber, I now pour over the models 13 the viscous mold material 14 of the character described, for example, plasticized polyvinyl chloride which has been heated to bring it to a flowable condition. Immediately after the mold material has been poured into the flask, the latter is placed in the pressure chamber 15. The particular construction of this pressure chamber forms no part of the present invention, and I wish it to be understood that the elevated pressure may be applied to the mold material 14 in any desired manner. I have found that very good results are obtained with the use of an air pressure chamber. However, the pressure may be applied mechanically, as by means of a plunger pressing downwardly against the mold material in the flask. In this case, the flask should be made of steel in order to withstand the high pressures created by the plunger. When the pressure is applied pneumatically, with the flask arranged entirely within the pressure chamber, as shown in Figs. 1 and 2, the pressure on the inside and outside of the flask is equalized, and it can be lightly constructed.

The pressure chamber 15 may conveniently be made in the form of a steel cylinder 16 open at one end and closed at the other, as at 17. A transverse partition 18 provides a floor on which the flask is adapted to rest. The pressure chamber may be carried on suitable supports such as the brackets 19, by which it is mounted on a bench or work table. Suitable means are provided for closing the open end of the cylinder, and in the construction shown, I have provided for this purpose a pressure door 20 hinged at 21 to lugs associated with a flange 22 at the end of the cylinder. Clamping nuts 23 disposed at suitable intervals around the periphery of the door 20 engage bolts pivotally mounted, as at 24, on the cylinder flange to draw the pressure door tightly against the sealing gasket 26 and provide a pressure lock. The chamber is provided with an air inlet valve 27 and outlet valve 28; also, with a pressure indicator such as the gauge 29. The air inlet pipe 30 is connected to a suitable source of compressed air (not shown) through a pressure regulating valve 31 with which is associated a gauge 32.

After the flask 10 has been slid into the chamber and the chamber sealed by means of the door 20, the outlet valve 28 is closed tightly and the inlet valve 27 opened. Thereupon the pressure regulating valve 31 is adjusted to the desired air pressure and after the pressure indicated by the gauge 29 has reached the desired value and become constant, the valve 27 is closed. The pressure is maintained during the setting of the mold material 14 to a rubber-like consistency, or at least during a substantial portion of the setting period, which may be from 5 minutes, or less, to 1 hour, or more. Usually a period of 30 minutes will suffice when a plasticized vinyl chloride is used for the mold material. Thereafter the pressure is released gradually by opening the valve 28 slightly, and after the pressure has reached atmospheric, the chamber is opened and the flask removed.

As a specific example of the reproduction of natural teeth, I cite the following: six upper anterior extracted natural teeth were set up on their root bases in a flask, and melted "Korogel" poured over these teeth. The "Korogel" used consisted of 35% new "Korogel" and 65% used "Korogel," which mixture was poured at a temperature of 150° C. After the "Korogel" had cooled, the natural teeth were removed and plaster casts were made in the cavities of the mold so produced. The plaster casts were dried thoroughly and then set up in a flask. Melted "Korogel" was then poured over these models in a manner similar to that which has been described. After pouring of the "Korogel," the flask with its models surrounded by the liquid mold material was inserted immediately into an air pressure chamber, the chamber sealed, and an air pressure of 300 pounds per square inch applied. After a period of 30 minutes under a pressure of 300 pounds per square inch, the pressure was released gradually to atmospheric over a period of 90 minutes. The models were left in the mold for about 15 hours, thereafter removed and the mold allowed to stand for 24 hours before using. Plaster casts were then made in the cavities of the mold, with the following results:

| Teeth used | Increase in size |
| --- | --- |
| | Per cent |
| Left canine | 8.10 |
| Left lateral | 8.75 |
| Left central | 7.17 |
| Right central | 8.32 |
| Right lateral | 8.52 |
| Right canine | 8.36 |
| Average | 8.20 |

The intensification of the surface details of all of the six teeth was pronounced.

Fig. 3 illustrates the step of casting the intensified plaster models in the mold after removal of the original models 13. The reproduction material is cast in the mold cavities 34, and after it has hardened the models 33 are removed from the mold. These models may then be used as starting models for a subsequent intensification step, or may be used in the production of mold equipment for the manufacture of the finished teeth. Alternatively, the mold 14 may be used as the finish mold, casting into it the porcelain tooth material, which is removed after it has been dried and hardened into the "biscuit" stage. Thereafter the biscuits are fired in the usual manner to vitrify the porcelain. Where the models 33 are used to produce permanent mold equipment, such equipment may be manufactured in accordance with methods well known to the art, and if desired, metal molds may be produced from master patterns, using the intensified models 33 for the original patterns.

Figure 5:
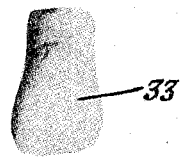

Fig. 5 represents such a pattern or model 33 produced in a mold subjected to a pressure of 50 pounds per square inch during setting of the mold material around the model shown in Fig. 4.

Figure 6:
Figure 7:
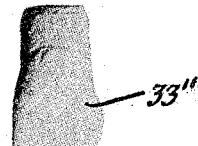

Figs. 6, 7 and 8 show similar intensified models produced from the model of Fig. 4 at higher pressures. Model 33' was produced from a mold which was subjected to a pressure of 100 pounds per square inch; model 33" from a mold subjected to 200 pounds per square inch; and model 33'" from a mold subjected to 300 pounds per square inch.

Fig. 9 shows a completed tooth produced in a mold made from the pattern provided by model 33'", showing the reduction in size upon firing.

With reference to the increase in degree of intensification with increases in the pressure applied to the mold material during setting, compare Figs. 5, 6, 7 and 8. The increase in degree of intensification seems to be proportionate to the increase in degree of enlargement, the degree of intensification increasing directly with the pressure. While it is difficult to portray the varying degrees of intensification accurately in drawings, the photolithographic reproductions show to a certain extent the increase in the "ruggedness" of the appearance of the surface as the pressure increases. For example, it will be observed that the surface markings of the model shown in Fig. 6 are much more prominent than is the case with the model of Fig. 4. Similarly, in Fig. 8 the exaggeration of the surface markings is even more pronounced. The curious thing about the results produced by the method I have described is that the characterizing surface features are enlarged to a proportionately greater extent than the enlargement of the tooth as a whole. The value of this phenomenon is that it can be utilized to compensate for the loss in detail which occurs when a porcelain tooth or the like is fired to vitrify it. As a result, the fired porcelain teeth produced by using the intensified reproductions as patterns or models more closely duplicate the natural tooth than is the case with artificial teeth produced by methods known heretofore. Selection of the pressure employed and the consequent degree of intensification or exaggeration of the surface features is made with the idea of compensating for such loss of surface detail as will be encountered in the particular tooth manufacturing process employed.

The terms and expressions which I have employed are used in a descriptive and not a limiting sense, and I have no intention of excluding such equivalents of the invention described, or of portions thereof, as fall within the purview of the claims.

The term "fluids," as used herein and in the appended claims, is employed in its usual technical significance as including both liquid and gaseous substances.

I claim:

1. In the molding of a reproduction of an article, the method of producing intensified surface features which comprises the steps of molding a model of the article having an adsorptive surface, disposing around the model a molten vinyl chloride and subjecting the surface of said vinyl chloride to super-atmospheric pressure during at least a portion of the setting period for said vinyl chloride.

2. In the molding of a reproduction of an article, the method of producing intensified surface features which comprises the steps of molding a model of the article having a non-vitreous ceramic surface, disposing around the model a molten vinyl chloride, and subjecting the surface of said vinyl chloride to superatmospheric pressure during at least a portion of the setting period for said vinyl chloride.

3. In the molding of a reproduction of an article, the method of producing intensified surface features which comprises the steps of molding a non-vitreous ceramic model of the article, disposing around the model a molten vinyl chloride, and subjecting the surface of said vinyl chloride to super-atmospheric pressure during at least a portion of the setting period for said vinyl chloride.

4. In the molding of a reproduction of an article, the method of producing intensified surface features which comprises the steps of molding a model of the article in a material which permits at least limited penetration by fluids, disposing around the model a molten vinyl chloride, and subjecting the surface of said vinyl chloride to super-atmospheric pressure during at least a portion of the setting period for said vinyl chloride.

5. In the molding of a reproduction of an article, the method of producing intensified surface features which comprises the steps of molding a model of an article from a material which permits at least limited penetration by fluids, arranging the model in a flask, introducing into the flask a molten vinyl chloride, subjecting the surface of said vinyl chloride to elevated pressure during at least a portion of the setting period for said vinyl chloride, decreasing the pressure for a substantial additional period, removing said model from the vinyl chloride, and casting reproduction material in the mold cavity thus formed.

6. In the molding of a reproduction of an article, the method of producing intensified surface features which comprises the steps of molding a model of the article from a non-vitreous ceramic material, arranging the model in a flask, introducing into the flask a molten vinyl chloride, and maintaining a pressure on the surface of the vinyl chloride in the flask during at least a portion of the setting period for said vinyl chloride.

7. In the molding of a reproduction of an article, the method of producing intensified surface features which comprises the steps of molding a model of the article from a non-vitreous ceramic material, arranging the model in a flask, introducing into the flask a molten vinyl chloride, maintaining a pressure on the surface of the vinyl chloride in the flask during at least a portion of the setting period for said vinyl chloride, decreasing the pressure for a substantial additional period, removing said model from the vinyl chloride and casting reproduction material in the mold cavity thus formed.

8. In the molding of a reproduction of an article, the method of producing intensified surface features which comprises the steps of molding a plaster model of the article, disposing around the model molten vinyl chloride, and subjecting said vinyl chloride to elevated pressure while it cools and sets toward a rubber-like consistency.

9. In the molding of a reproduction of an article, the method of producing intensified surface features which comprises the steps of molding a plaster model of the article, disposing around the model molten plasticized polyvinyl chloride, and subjecting said polyvinyl chloride to elevated pressure during at least a portion of the period required for it to cool and set to a substantially non-flowable condition.

10. A method of making a mold for an artificial tooth which comprises providing a plaster model of the tooth, disposing around the model a molten vinyl chloride, subjecting said vinyl chloride to elevated pressure during at least a portion of the setting period for said vinyl chloride, removing the model from the vinyl chloride, casting reproduction material in the mold cavity thus formed, removing the hardened reproduction material from the cavity, and employing it as a pattern for a mold.

11. In the molding of a reproduction of an article, the method of enlargement which comprises the steps of providing a model of the article having an adsorptive surface, disposing around the model a molten vinyl chloride, and subjecting the surface of said vinyl chloride to elevated pressure during at least a portion of the setting period for said vinyl chloride.

PYUNGTOO W. LEE.